(12) United States Patent
Schroder et al.

(10) Patent No.: US 9,516,725 B2
(45) Date of Patent: Dec. 6, 2016

(54) DISTRIBUTED LIGHTING NETWORKS

(75) Inventors: Helmut Schroder, Wiesbaden (GE); Daniel Brand, Cologne (GE)

(73) Assignee: SCHREDER, Brussels (BE)

( * ) Notice: Subject to any disclaimer, the term of this patent is extended or adjusted under 35 U.S.C. 154(b) by 0 days.

(21) Appl. No.: 14/396,065

(22) PCT Filed: Apr. 27, 2012

(86) PCT No.: PCT/EP2012/057843
§ 371 (c)(1),
(2), (4) Date: Oct. 22, 2014

(87) PCT Pub. No.: WO2013/159831
PCT Pub. Date: Oct. 31, 2013

(65) Prior Publication Data
US 2015/0115806 A1    Apr. 30, 2015

(51) Int. Cl.
*H05B 37/02* (2006.01)

(52) U.S. Cl.
CPC ...... *H05B 37/0227* (2013.01); *H05B 37/0272* (2013.01); *H05B 37/0281* (2013.01)

(58) Field of Classification Search
CPC .............. H05B 37/0254; H05B 37/029; H05B 37/0272; H05B 37/0281
USPC ................................ 315/212, 218, 307, 294
See application file for complete search history.

(56) References Cited

U.S. PATENT DOCUMENTS

2006/0125426 A1* 6/2006 Veskovic et al. ............. 315/312
2007/0206375 A1* 9/2007 Piepgras et al. .............. 362/147
2008/0276154 A1* 11/2008 Hick et al. .................... 714/799
(Continued)

FOREIGN PATENT DOCUMENTS

WO    WO2009126024 A1    10/2009
WO    WO 2009126024 A1 *  10/2009 ............ H05B 37/02
(Continued)

OTHER PUBLICATIONS

ISA/EP International Search Report issued Jan. 14, 2013 re PCT Application No. PCT/EP2012/057843, filed Apr. 27, 2012.

*Primary Examiner* — Douglas W Owens
*Assistant Examiner* — Syed M Kaiser
(74) *Attorney, Agent, or Firm* — Patrick J. Daugherty; Driggs, Hogg, Daugherty & Del Zoppo Co., LPA

(57) ABSTRACT

Described herein is an autonomous distributed lighting network which comprises a plurality of luminaires for providing lighting levels in accordance with idle dimming profiles, at least one sensor for sensing ambient conditions, and a communications network. Luminaire nodes, sensor nodes, a timer node and a controller node are connectable to the communications network. Each luminaire node is associated with a luminaire and is operable for receiving broadcast messages from the communications network, the luminaire overriding its normal idle dimming profile in response to an appropriate broadcast message. Each sensor node is associated with at least one sensor device and transmits broadcast messages onto the communications network in accordance with events sensed by each related sensor device. A timer node, if present, provides time synchronisation for the luminaires within the network. In addition, a controller node is used for set up and maintenance of the network.

19 Claims, 1 Drawing Sheet

(56) References Cited

U.S. PATENT DOCUMENTS

2010/0262296 A1* 10/2010 Davis .................... G05B 15/02
                                                      700/275
2010/0262297 A1* 10/2010 Shloush ............ H05B 37/0218
                                                      700/276

FOREIGN PATENT DOCUMENTS

WO    WO 2009129232 A1 * 10/2009  ............ H05B 37/02
WO     WO2009129232 A1    10/2009

* cited by examiner

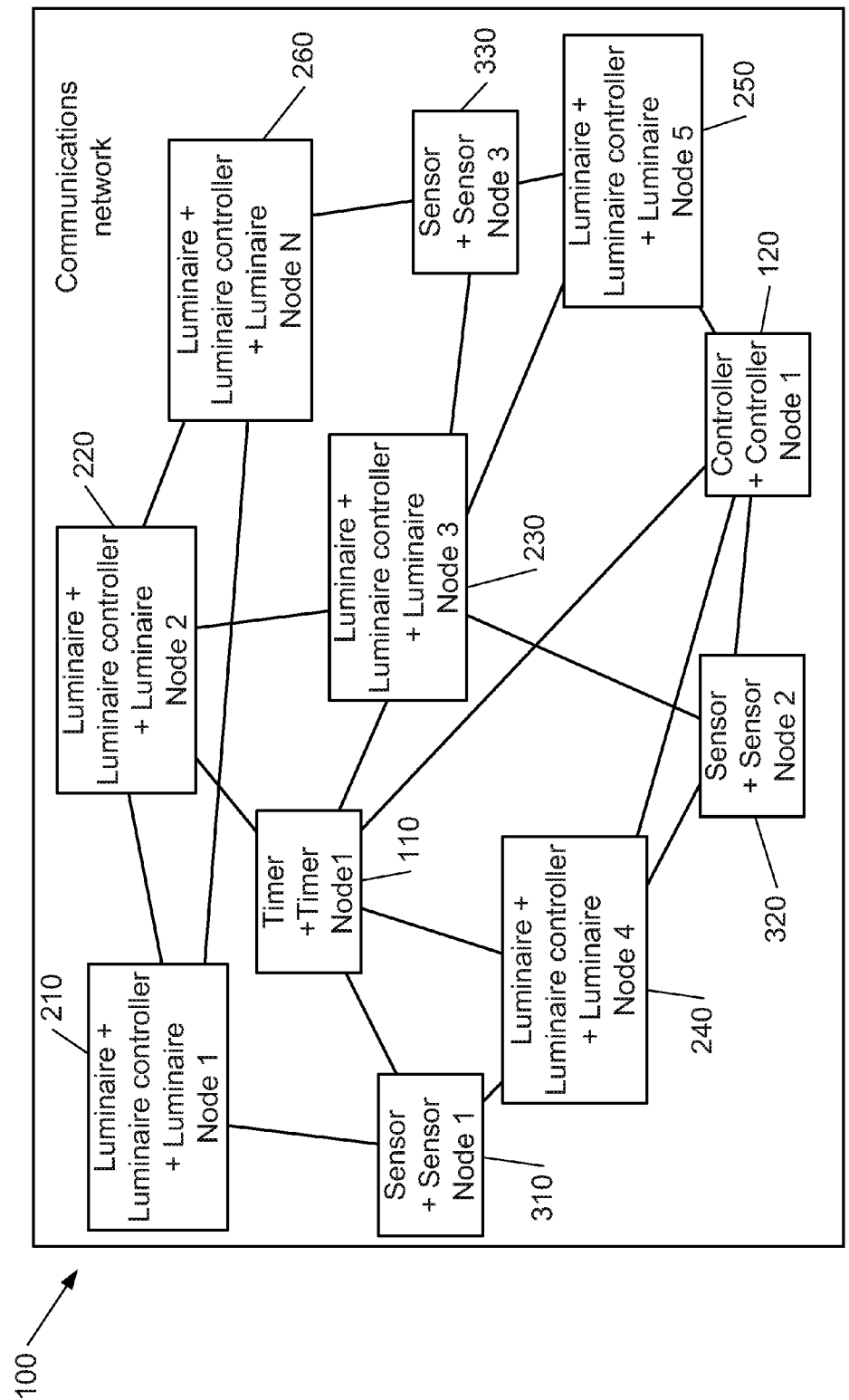

DISTRIBUTED LIGHTING NETWORKS

FIELD OF THE INVENTION

The present invention relates to distributed lighting networks, and is more particularly concerned with autonomous lighting networks.

BACKGROUND TO THE INVENTION

It is known to use lighting systems in large areas in which lighting is grouped together for operation. One such system is described in EP-A-1239704. In the system described in EP-A-1239704, a central control unit controls a plurality of localised areas either directly by connection with a load within each localised area or via a support control unit connected to a load in one or more localised areas. The load in this case corresponds to a circuit group providing the lighting. Management of the local circuit groups is achieved using radio frequency (RF) networks. However, the control unit and support control units are always operational for the whole time that the light system is on, that is, lighting at least one of the localised areas.

SUMMARY OF THE INVENTION

It is therefore an object of the present invention to provide a distributed lighting network in which lighting elements and sensors are distributed throughout the network, each lighting element operating independently of any other lighting element.

It is another object of the present invention to provide an autonomous distributed lighting network which, during normal operation, does not require a central controller.

In accordance with the present invention, there is provided a distributed lighting network comprising:—
  a plurality of luminaires;
  at least one sensor device; and
  a communications network;
  characterised in that each luminaire comprises a luminaire node connected to the communications network for receiving broadcast messages therefrom, and each sensor device is associated with a sensor node connected to the communications network for transmitting broadcast messages thereto;
  and in that each sensor node transmits a broadcast message onto the communications network in response to an event being detected by an associated sensor device.

It will be appreciated that the sensor devices may be operable for detecting different conditions and each one of these conditions is termed "an event" herein.

Each luminaire may have an idle dimming profile and an event dimming profile, the event dimming profile overriding the idle dimming profile in accordance with an appropriate broadcast message received at its respective luminaire node.

The terms "idle dimming profile" and "event dimming profile" refer respectively to the normal lighting profile of a luminaire in accordance with a 24-hour cycle and a temporary lighting profile which is needed on the detection of an event.

The idle dimming profile is adjustable in accordance with seasonal changes. This ensures that the correct lighting levels are provided at all times of the year.

The event dimming profile may comprise an increased lighting level. In one embodiment, the event dimming profile comprises a ramp up period from the lighting level of the idle dimming profile. The ramp up period may be followed by a hold period, which, in turn, is followed by a ramp down period.

It will be appreciated that during the ramp up period, the lighting level is gradually increased, over a predetermined period of time, until it reaches the desired elevated level. During the hold period, the lighting level is maintained at the elevated level for a predetermined period of time. During the ramp down period, the lighting level is gradually decreased, over a predetermined period of time, until the lighting level of the idle dimming profile for that particular time of day is reached. At this point, the idle dimming profile is no longer overridden by the event dimming profile.

Preferably, each luminaire has a sensor responsibility matrix comprising at least one sensor device to which the luminaire is to respond. In one embodiment, the sensor device may comprise a motion sensor which generates an event signal in accordance with a detected motion, the event signal initiating a broadcast message fro the communications network from the associated sensor node.

Ideally, the broadcast message is transmitted to each luminaire via its respective luminaire node.

In one embodiment, each luminaire node operates only in a receive mode for receiving broadcast messages from the communications network.

Each luminaire node may control the operation of driver circuits for its respective luminaire.

The distributed lighting network may further comprise a timer node operable for synchronising the time of each luminaire within the network via its respective luminaire node.

Additionally, the network may further comprise a removable controller node for setting up the network. The controller node may assign parameters to each luminaire node and each sensor node at set up via the communications network. Such parameters may include idle dimming profiles, event dimming profiles and sensor responsibility matrices for the luminaires and the assignation of sensors to the sensor nodes. Moreover, the removable controller node may be used for maintenance of the network.

BRIEF DESCRIPTION OF THE DRAWINGS

For a better understanding of the present invention, reference will now be made, by way of example only, to the accompanying drawing in which:
FIG. 1 illustrates a distributed lighting network in accordance with the present invention.

DESCRIPTION OF THE INVENTION

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

Luminaires are well-known for lighting large areas and can be used, for example, for street lighting. Each luminaire comprises a plurality of light-emitting diode (LED) elements, a driver circuit for controlling the operation of the LEDs, and a luminaire controller which controls the driver circuit and hence the operation of the LEDs.

A distributed lighting network will be described below which comprises a plurality of nodes, each node being operable for transmitting broadcast signals onto a communications network or for receiving broadcast signals from the communications network as till be described in more detail below. The nodes include lighting element nodes, for example, luminaire nodes, and sensor nodes connected to sensor devices which sense the ambient conditions. In some embodiments, timer nodes are also included in the lighting network as will be described in more detail below.

Each luminaire is connected to an associated luminaire node in the network, and is controlled thereby in relation to broadcast signals on the communications network. Each luminaire has its own idle dimming profile which is a 24-hour cycle of lighting levels which need to be provided by the luminaire. The idle dimming profile may be stored in the luminaire controller, the luminaire node or both the luminaire controller and the luminaire node depending on the functionality of luminaire controller implemented as part of the lighting network.

Each sensor device is connected to an associated sensor node, and each sensor node may be connected to more than one sensor device and acts as a router for transmitting signals from individual sensor devices as broadcast messages onto the communications network.

If a timer node is present in the lighting network, the idle dimming profile will have sharp timings of dimming and switching as the timer node provides time synchronisation signals in broadcast messages on the communications network. Luminaires use these broadcast messages to adjust their idle dimming profile so that they are correct with respect to the season.

If no timer node is present in the lighting network, the supply network will be switched OFF during daytime hours and will be switched ON during night-time hours. Each luminaire node can determine a "middle of the night" value after a few ON/OFF switching cycles. The idle dimming profile is aligned relative to this "middle of the night" value with, for example, dimming to 50% for two hours before and three hours after the "middle of the night". It will be appreciated that this is not as accurate as if a timer node is present but can be used in the event of a timer node failure.

In several countries, the mains power used to power luminaires is permanently ON which means that any network is responsible for switching the luminaires ON during the appropriate periods of the night and for adjusting default idle dimming profiles of the luminaires according to a pre-programmed sequence. This means that the driver circuits for driving the LEDs in the luminaires are controlled by the luminaire controller to provide the required switching and dimming operations.

One way of controlling the LED driver circuits is to switch the driver circuit OFF completely during the day if there is a switch provided ahead of the driver circuit. Here, a switching relay is required including a ZigBee interface that can switch mains power and has the required level of isolation.

ZigBee is a trademark of the ZigBee Alliance which provides a specification for a suite of high level communication protocols using small, low-power digital radios based on an IEEE 802 standard for personal area networks. ZigBee is particularly useful in radio frequency (RF) applications where low data rates, long battery life and secure networking are required, and where periodic or intermittent data transmission or a single signal transmission is required from a sensor or other input device.

Another way of controlling the LED driver circuits is to use a '0-10V' input or digital addressable lighting interface (DALI) input. In this case, the output current of the driver circuit is set to 0 when it is desired that the associated luminaire is switched OFF. Nevertheless, there is always a remaining quiescent current that can vary from one driver circuit to another.

DALI is a technical standard for network-based systems for controlling lighting in buildings. It was established as a successor to '0-10V' lighting control systems, but both systems are still currently used. DALI is an open standard which is an alternative to digital signal interface (DSI) on which it is based. The DALI standard also incorporates a communications protocol and electrical interface for lighting control networks.

A conventional DALI network comprises a controller and one or more lighting devices, for example, electrical ballasts and dimmers, each lighting device having a DALI interface. The controller can monitor and control each lighting device by means of a bi-directional data exchange. The DALI protocol allows lighting devices to be individually addressed as well as to be addressed in groups.

In a DALI network, each lighting device is assigned a unique static address in the numeric range from 0 to 63 making it possible to have 64 devices in a standalone system. Alternatively, DALI can be used as a subsystem via DALI gateways to address more than 64 devices. Data is transferred between the controller and each device by means of an asynchronous, half-duplex, serial protocol over a two-wire differential bus with a fixed data transfer rate, typically of 1200 bits per second. The network may be arranged in a bus or star topology or a combination thereof. As the DALI system is not classified as being separated extra low voltage (SELV), it can be run next to mains cables or within a multi-core cable that includes mains power. Data is transmitted using Manchester encoding (also known as phase encoding) and has a high signal-to-noise ratio which enables reliable communication in the presence of a large amount of electrical noise.

An alternative way of controlling the LED driver circuits is to use a light sensor to switch the power supply when the ambient light falls below a certain predetermined level so that the luminaire is switched ON and it follows its idle dimming profile. However, this solution may not be efficient if all luminaires are not capable of relaying signals, and the other two ways of controlling the LED driver circuits are preferred as described above.

In other countries, the mains power feeding luminaires is switched between a day-time or OFF setting and a night-time or ON setting. Here, the lighting network including the luminaires needs to be sufficiently flexible to accommodate additional elements into the network, for example, sensor nodes and/or timer nodes, which may need to be permanently ON regardless of the status of the luminaires themselves.

As mentioned above, it may be required to dim each luminaire according to its idle dimming profile that is dependent on the duration of periods of darkness which change in accordance with the change of the seasons. Such an idle dimming profile can be implemented in a node having the capability of evaluating ambient conditions so that switching is correctly implemented. This can be implemented using a real-time atomic clock which determines the real local time and adjusts the programmed idle dimming profiles over the year, using a luminaire controller to control the ON and OFF periods for the luminaire, or to allow remote programming of these periods via an entry point to the network using an internet connection, for example.

In a given network, the idle dimming profile may be different for different individual luminaires or for different groups of luminaires. Luminaires may be grouped together according to their idle dimming profiles, but each luminaire is controlled independently. This provides advantages during set up of the network as well as during its operation. For example, in a street having one group of luminaires to light it and another group of luminaires to light the sidewalk or roadside path for pedestrians and/or cyclists, the timing and idle dimming levels for each group can be individually set and controlled to optimise illumination in accordance with demand.

In some areas, motion detection can be used to increase the flux generated by luminaires that are following their normal idle dimming profiles. Here, luminaires following their normal pre-programmed nightly idle dimming profile can be activated to provide full power when receiving a sensor signal from a motion sensor to which it is programmed to react. In this case, the sensor node is associated with a motion sensor which generates the sensor signal when motion is detected so that lighting in the immediate vicinity or in the locality of the detected motion can be increased for a predetermined amount of time either immediately or gradually by overriding the normal idle dimming profile as will be described in more detail below. The sensor node, in this case, routes the sensor signal from the motion detector to the network so that the lighting level of associated luminaire(s) can be increased accordingly. However, other types of sensor devices can also be utilised to control the increase of illumination or lighting level on demand.

Each sensor node transmits a broadcast message onto the communications network when an "event" is detected by one of the sensors with which it associated. Such a broadcast message provides information related to the "activated" sensor device, that is, the sensor device that has detected the event. All nodes on the communications network in range receive the broadcast message, the range being determined by the number of "hops" between nodes which is configured in the ZigBee layer of each sensor node. Each sensor transmits its "sensor activated" signal to its associated sensor node immediately and the transmission of the broadcast message is controlled in accordance with the ZigBee protocol standard.

Luminaire nodes with which the activated sensor is associated are activated to override the normal idle dimming profiles of their respective luminaires to increase their lighting levels for a predetermined period of time. In accordance with the ZigBee protocol standard, the timing of subsequent broadcast messages relating to "sensor activated" signals is adjusted to avoid collision between data signals on the communications network.

As described above, each sensor node is connected to at least one sensor, and, when one sensor detects an "event" and provides a sensor signal to the associated sensor node, a "sensor activated" message corresponding to the sensor signal is broadcast to the entire communications network. However, only the luminaire node associated with the sensor that detected the "event" will be able to act on the broadcast message.

For example, if a "sensor activated" message is sent by a sensor node to the communications network for activating the luminaire(s) associated with the sensor device that generated the sensor signal providing the "sensor activated" message, no further sensor messages are sent during a predefined inhibit period, that is, the sensor node experiences an idle-time before it can transmit additional broadcast "sensor activated" messages when a new "sensor activated" signal is received from one of the sensor devices associated with that sensor node. If another "sensor activated" message relating to the same sensor device is transmitted to the sensor node, a subsequent broadcast message is put on the communications network and the luminaire nodes of the luminaires associated with the sensor device have their normal idle dimming profile overridden again. If no further broadcast messages are received for the luminaire(s) whose idle dimming profiles have been overridden at the end of this predefined inhibit period, each relevant luminaire is returned to its normal idle dimming profile until the next appropriate "sensor activated" broadcast message is received at its luminaire node from the communications network.

Each luminaire is associated with one of more sensor devices, and, if its associated luminaire node receives a broadcast message that one of the sensor devices to which it should react has detected an "event", the luminaire node sets the LED driver associated with the respective luminaire in accordance with an "event dimming profile" which replaces or overrides the normal idle dimming profile for a pre-programmed period of time. For example, an "event dimming profile" may include a ramp up period in which the lighting level is increased, either gradually or immediately, a hold period which follows the ramp up period and in which the elevated light level is maintained for a predetermined period of time, and a ramp down period after the hold period has expired in which the lighting level is decreased, either gradually or immediately, to the lighting level of the normal idle dimming profile.

As described above, the idle dimming profile may be stored in the luminaire controller, the luminaire node or both the luminaire controller and the luminaire node. This will depend on the functionality of the luminaire controller implemented in the lighting network. Similarly, the event dimming profile may be stored in the luminaire controller, the luminaire node or both the luminaire controller and the luminaire node. In any case, each "luminaire" is considered to have an associated idle dimming profile and an associated event dimming profile.

Sensor devices are assigned to each luminaire or group of luminaires by a controller node in a set up session. The controller node is also used for full set up of the lighting network as will be described in more detail below.

Reaction times of the communications network are such that broadcast messages are processed to keep latency to a minimum. As an example, reaction times of the order of a maximum of 300 ms are envisaged.

Turning now to FIG. 1, a distributed lighting network 100 in accordance with the present invention is shown. The network 100 comprises a plurality of luminaire nodes 210, 220, 230, 240, 250, 260, a plurality of sensor nodes 310, 320, 330, a timer node 110 and a controller node 120. As shown, the nodes 110, 120, 210, 220, 230, 240, 250, 260, 310, 320, 330 are distributed within the network 100 and each node is connected to at least one other node via the network but not necessarily to a node of the same type.

Each luminaire node 210, 220, 230, 240, 250, 260 corresponds to a single luminaire and associated luminaire controller, each luminaire node controlling a LED driver for that single luminaire. The luminaire nodes 210, 220, 230, 240, 250, 260 are programmed to receive some set up parameters, for example, a list of sensor devices to which each luminaire node 210, 220, 230, 240, 250, 260 is to react, a normal idle dimming profile, and an event dimming profile including a schedule for idle times and "event" detection. In this embodiment, the luminaire nodes 210, 220, 230, 240, 250, 260 operate in a "receive only" mode and therefore do not send any information from the luminaires back to other nodes on the network. However, it will be appreciated that in other implementations of a distributed network in accordance with the present invention, the luminaire nodes may operate in both "receive" and "transmit" modes.

Each sensor node 310, 320, 330 is associated with a single sensor device or a group of sensor devices (not shown), and receives signals relating to detected "events" of each sensor device associated with it. Once an "event" detection signal is received at a sensor node 310, 320, 330, the relevant sensor node broadcasts a "sensor activated" message throughout the communications network as described above. The "sensor activated" message includes the identification (ID) of the sensor node from which the broadcast message originates as well as the particular sensor device which has been activated by the "event". It will be appreciated that more than one sensor device may be activated by an "event", and, in that case, the broadcast message will include details of all activated sensor devices associated with the particular sensor node ID. All luminaire nodes 210, 220, 230, 240, 250, 260 in range of the broadcast will receive the same information and every luminaire node receiving the broadcast will compare this sensor device information with its pre-configured sensor responsibility matrix to determine if it needs to enable its luminaire to react to the sensor device information. If the sensor device information originates from a sensor device listed in the sensor responsibility matrix, the normal idle dimming profile of the luminaire will be overridden with its event dimming profile.

The timer node 110 is responsible for broadcasting a time stamp onto the communications network so that each luminaire node can synchronise date and time so that its associated idle dimming profile can be implemented correctly.

The controller node 120 is only used during initial set up of the lighting network 100 and during maintenance thereof. The controller node 120 comprises a portable device, for example, a portable computer with a ZigBee transceiver which connects to the network 100 as required for set up and for maintenance.

The network 100 is designed to be autonomous in operation, but it is necessary to use the controller node 120 to ensure that the network is set up correctly, that is, each luminaire is set up in accordance with its configuration of timings, idle dimming profile, event dimming profile and sensor responsibility matrix. During network set up, the computer of the controller node 120 utilises a specific program to implement the following within the network 100:

Proper detection and identification of all devices or elements in the network 100;

Assignation of unique identifiers, for example, L1, L2 etc. for luminaire nodes, S1, S2 etc. for sensor nodes and T1, T2 etc. for timer nodes; and Programming the luminaire nodes in accordance with the list of sensors for which they need to provide a response and also to the "event" dimming profile that needs to be followed when a "sensor activated" broadcast message is received from one of its associated sensors over the communications network.

Naturally, this list of set up parameters is not exhaustive and can be tailored for the particular network being set up.

Once the network 100 is properly set up, the controller node 120 is disconnected and removed, and the remaining nodes in the lighting network 100 retain their assigned parameters. Through communications network identification, broadcast messages are only available for all node elements within the lighting network. As described above, depending on the type of node element, they will operate in accordance with their retained associated links.

Once in service, the network ensures that messages from the sensor nodes and/or timer nodes are correctly broadcast to the luminaire nodes. This communication is uni-directional with respect to the luminaire modes as described above as no messages can originate at a luminaire mode for transmission therefrom onto the network. As described above, the network utilises the broadcast mode of transmission in accordance with the ZigBee protocol standard. This allows quick routing of broadcast messages whilst avoiding the need for a network controller for normal operation.

A record of network parameters is kept for future use if maintenance becomes required. The record comprises all nodes arranged in a map showing the details of their respective locations. From this map, it is relatively simple to build a sensor-luminaire assignation matrix.

Naturally, it may be necessary to update the network and the correct assignation of node addresses to ID numbers will assist in the case where a node needs to be replaced.

The network includes built-in strategies in case of node communication failure, for example, due to poor RF transmission or to the failure of a node, which leaves some nodes without a communication link.

In the case of a sensor failure, the luminaire nodes are programmed to follow the idle dimming profile provided by the timing node. It will be appreciated that this strategy can lead to unacceptable situations in terms of safety. If this is the case, the luminaire node can be programmed to drive its respective luminaire to maintain full power if it has not received any messages from a sensor device within a predetermined period.

In the case of luminaire failure, as the luminaire nodes operate in "receive only" mode, the problem can only be addressed during a maintenance cycle. When the controller node is connected to the network, a lost connection due to a failed luminaire, luminaire node, sensor device, sensor node and/or timer node can be diagnosed and corrective action taken.

In a one embodiment of the present invention, sensor nodes may comprise ZigBee transceivers as they only need to transmit broadcast messages relating to a sensor device that has detected an "event". However, in a more advanced embodiment, the sensor node may be an internet protocol (IP) protected box including a ZigBee module with a power supply to power both the sensor node and the ZigBee module. Alternatively, the sensor node may be located external to the transmitting box and has its own casing. In another alternative, the sensor node may be internal to the transmitting box and may comprise a simple passive infrared device.

Sensor devices may be integrated into an aesthetic casing mounted on the pole of the luminaire or they can be integrated into a space within the luminaire itself.

The timing node includes some real-time clock capabilities which may be provided by a global positioning system (GPS) or a DCF77 time receiver. The DCF77 time receiver uses long wave signals generated at a frequency of 77.5 kHz (DCF stands for Germany (D), long wave signal (C), and Frankfurt (F)) and is commonly used for setting the time of radio clocks and watches automatically. The timing node also includes some additional electronics, for example, a microprocessor, for receiving the idle dimming profiles from the controller node during set up and for sending broadcast messages to the luminaires to control their idle dimming profiles.

The luminaire node may be a "PiCo" device having either a '0-10V' output or a DALI output to drive all the dimmable LEDs and human interface device (HID) drivers. A "PiCo" device is a luminaire controller including a photocell which senses ambient conditions and provides additional dimming control signals in accordance with the sensed conditions. In addition, a "PiCo" device may include energy metering capability.

The controller node can readily be implemented using an off-the-shelf ZigBee transceiver which can be connected to a computer.

Although the present invention has been described with reference to a particular implementation, it will be appreciated that other implementations are also possible.

The invention claimed is:

1. A distributed lighting network comprising:
   a plurality of luminaires, each luminaire comprising a luminaire controller that is associated with a luminaire node;
   at least one sensor device that is associated with a sensor node; and
   a communications network that is connected to each luminaire node and to each sensor node;
   wherein:
   each luminaire node is configured to be connected to the communications network for receiving messages therefrom;
   each sensor node is configured to be connected to the communications network for transmitting messages thereto, each sensor node being configured for transmitting a message onto the communications network in response to an event being detected by an associated sensor device; and
   each luminaire controller is configured to store thereon an idle dimming profile comprising different lighting levels for different times of night and an event dimming profile comprising lighting levels which are increased with respect to the lighting levels of the idle dimming profile, and to select autonomously the event dimming profile to override the idle dimming profile in accordance with an appropriate message received at an associated luminaire node, each of the idle dimming profile and the event dimming profile being aligned relative to a middle of the night value.

2. The distributed lighting network according to claim 1, wherein the luminaire controller autonomously adjusts the period for which the luminaire is switched on in accordance with seasonal changes.

3. The distributed lighting network according to claim 1, wherein the luminaire controller initiates a ramp up during which ramp up period the luminaire controller gradually increases the lighting level of the idle dimming profile over a predetermined period of time until the lighting level reaches a desired elevated lighting level of the event dimming profile for that particular time of night.

4. The distributed lighting network according to claim 3, wherein the luminaire controller initiates a hold period after the ramp up period, during which hold period the luminaire controller maintains the desired elevated lighting level of the event dimming profile for a predetermined period of time.

5. The distributed lighting network according to claim 4, wherein the luminaire controller initiates a ramp down period after the hold period, during which ramp down period the luminaire controller gradually decreases the desired elevated lighting level of the event dimming profile until the lighting level reaches the lighting level of the idle dimming profile for that particular time of night.

6. The distributed lighting network according to claim 1, wherein each luminaire controller further comprises a sensor responsibility matrix comprising at least one sensor device to which the luminaire controller is to respond in accordance with the appropriate message received at the associated luminaire node, wherein the luminaire controller autonomously selects the event dimming profile to override the idle dimming profile in response to determining that the appropriate message received at the associated luminaire node is from a sensor device that is listed in the sensor responsibility matrix.

7. The distributed lighting network according to claim 6, wherein the at least one sensor device comprises a motion sensor configured for generating an event signal in accordance with a detected motion, the event signal initiating a broadcast message for the communications network from the sensor node associated with the at least one sensor device.

8. The distributed lighting network according to claim 7, wherein the broadcast message is transmitted to each luminaire controller via its respective luminaire node.

9. The distributed lighting network according to claim 1, wherein each luminaire controller controls the operation of driver circuits for its respective luminaire.

10. The distributed lighting network according to claim 1, further comprising:
    a timer node connected to the communications network and configured for synchronizing a time of each luminaire within the network via its respective luminaire node.

11. The distributed lighting network according to claim 1, further comprising:
    a removable controller node configured to be connected to the communications network, for setting up the distributed lighting network.

12. The distributed lighting network according to claim 11, wherein the controller node is configured for assigning parameters to each of the luminaire nodes and each of the at least one sensor nodes via the communications network.

13. The distributed lighting network according to claim 11, wherein the removable controller node is used for maintenance of the network.

14. A distributed lighting network comprising:
    a communications network having:
    at least one luminaire node configured for receiving broadcast messages from the communications network, the at least one luminaire node being associated with a luminaire controller; and
    at least one sensor node configured for transmitting broadcast messages to the communications network, the at least one sensor node being associated with at least one sensor device and being configured for broadcasting messages to the at least one luminaire node connected to the communications network;
    wherein:
    each of the at least one luminaire nodes is configured for controlling the operation of driver circuits for an associated luminaire;
    each of the at least one luminaires having stored thereon an idle dimming profile comprising different lighting levels for different times of night and an event dimming profile comprising lighting levels which are increased with respect to the lighting levels of the idle dimming profile for the respective different times of night, each luminaire controller being configured for overriding the idle dimming profile in accordance with an appropriate broadcast message received at an associated one of the at least one luminaire nodes, each of the idle dimming profile and the event dimming profile being aligned relative to a middle of the night value;

the at least one sensor device including a motion sensor configured for generating an event signal in accordance with a detected motion; and the luminaire controller autonomously selects the event dimming profile to override the idle dimming profile in response to broadcast messages transmitted onto the communications network in response to an event detection.

15. The distributed lighting network according to claim 14, further comprising:

a timer node configured for synchronizing a time of each luminaire within the communications network via its respective luminaire node.

16. A distributed lighting network comprising:

at least one luminaire, each luminaire having an idle dimming profile comprising different lighting levels for different times of night, and an event dimming profile comprising lighting levels which are increased with respect to the lighting levels of the idle dimming profile for the respective different times of night, each of the idle dimming profile and the event dimming profile being aligned relative to a middle of the night value;

at least one sensor device; and a communications network connected to each of the at least one luminaires by an associated luminaire node and to each of the at least one sensor devices by an associated sensor node;

wherein:

the communications network is configured for transmitting broadcast messages to each luminaire node and for receiving broadcast messages from each sensor node in response to an event being detected by a sensor device associated therewith; and the idle dimming profile for at least one luminaire is autonomously overridden by the event dimming profile in response to an appropriate broadcast message received at its associated luminaire node.

17. The distributed lighting network according to claim 16, wherein said at least one sensor device comprises a motion sensor which generates an event signal in accordance with a detected motion, the event signal initiating a broadcast message for the communications network from the associated sensor node.

18. The distributed lighting network according to claim 17, wherein the broadcast message is transmitted to each of the at least one luminaires via its associated luminaire node.

19. The distributed lighting network according to claim 15, further comprising:

a timer node configured for synchronizing a time of each of the at least one luminaires within the network via its respective luminaire node.

* * * * *